United States Patent
Kojo et al.

(10) Patent No.: US 10,435,074 B2
(45) Date of Patent: Oct. 8, 2019

(54) PARKING SUPPORT METHOD AND DEVICE

(71) Applicant: Nissan Motor Co., Ltd., Yokohama-shi, Kanagawa (JP)

(72) Inventors: Naoki Kojo, Kanagawa (JP); Tomoko Kurotobi, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 16/061,762

(22) PCT Filed: Aug. 1, 2016

(86) PCT No.: PCT/JP2016/072494
§ 371 (c)(1),
(2) Date: Jun. 13, 2018

(87) PCT Pub. No.: WO2017/104164
PCT Pub. Date: Jun. 22, 2017

(65) Prior Publication Data
US 2018/0370566 A1 Dec. 27, 2018

(30) Foreign Application Priority Data
Dec. 17, 2015 (JP) .................. 2015-246111

(51) Int. Cl.
*G08G 1/14* (2006.01)
*B62D 15/02* (2006.01)
(Continued)

(52) U.S. Cl.
CPC .......... *B62D 15/0275* (2013.01); *B60R 21/00* (2013.01); *B60R 21/0134* (2013.01);
(Continued)

(58) Field of Classification Search
CPC combination set(s) only.
See application file for complete search history.

(56) References Cited

U.S. PATENT DOCUMENTS 8,957,786 B2 * 2/2015 Stempnik ............... G08G 1/168
180/167
9,043,083 B2 * 5/2015 Kadowaki ................. B60R 1/00
340/932.2
(Continued)

FOREIGN PATENT DOCUMENTS

CN 102938064 B 6/2015
JP 2003054341 A 2/2003
(Continued)

*Primary Examiner* — Phung Nguyen
(74) *Attorney, Agent, or Firm* — Young Basile Hanlon & MacFarlane, P.C.

(57) ABSTRACT

A method is provided which comprises: acquiring recognition information about parked vehicles; setting a virtual parking frame group in which a parking frame group is virtualized, the parking frame group comprising a plurality of parking frames; aligning the virtual parking frame group with respect to the recognized parked vehicles; and determining the aligned virtual parking frame group as the parking frame group comprising the plurality of parking frames. The virtual parking frame group comprises a plurality of virtual parking frames that have the same size and are arranged side by side or parallel along a predetermined straight line.

19 Claims, 17 Drawing Sheets

(51) Int. Cl.
*B60R 21/00* (2006.01)
*G08G 1/16* (2006.01)
*B60R 21/0134* (2006.01)
*G06K 9/00* (2006.01)

(52) U.S. Cl.
CPC ........... *G06K 9/00812* (2013.01); *G08G 1/16* (2013.01); *G08G 1/168* (2013.01); *B60R 2021/01345* (2013.01); *B60T 2201/10* (2013.01)

(56) References Cited

U.S. PATENT DOCUMENTS

2004/0260439 A1* 12/2004 Endo ................. B60Q 1/48
701/36
2005/0285758 A1* 12/2005 Matsukawa ........... B60W 10/06
340/932.2
2010/0033348 A1* 2/2010 Kawabata ................. B60R 1/00
340/932.2

FOREIGN PATENT DOCUMENTS

| | | |
|---|---|---|
| JP | 2009096306 A | 5/2009 |
| JP | 2009196408 A | 9/2009 |
| JP | 2013220802 A | 10/2013 |
| JP | 2014104855 A | 6/2014 |

* cited by examiner

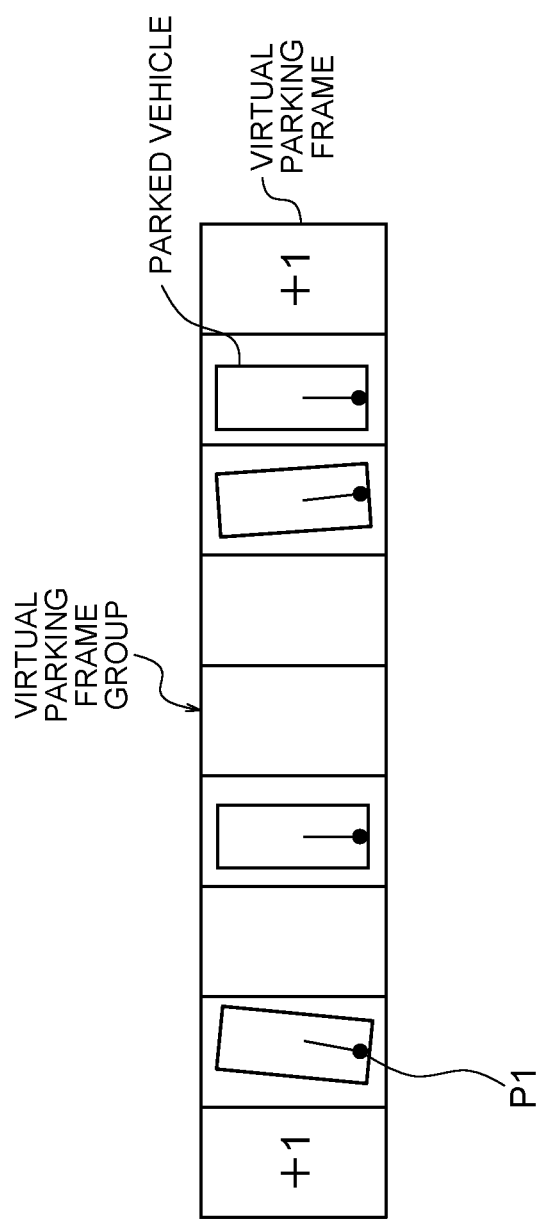

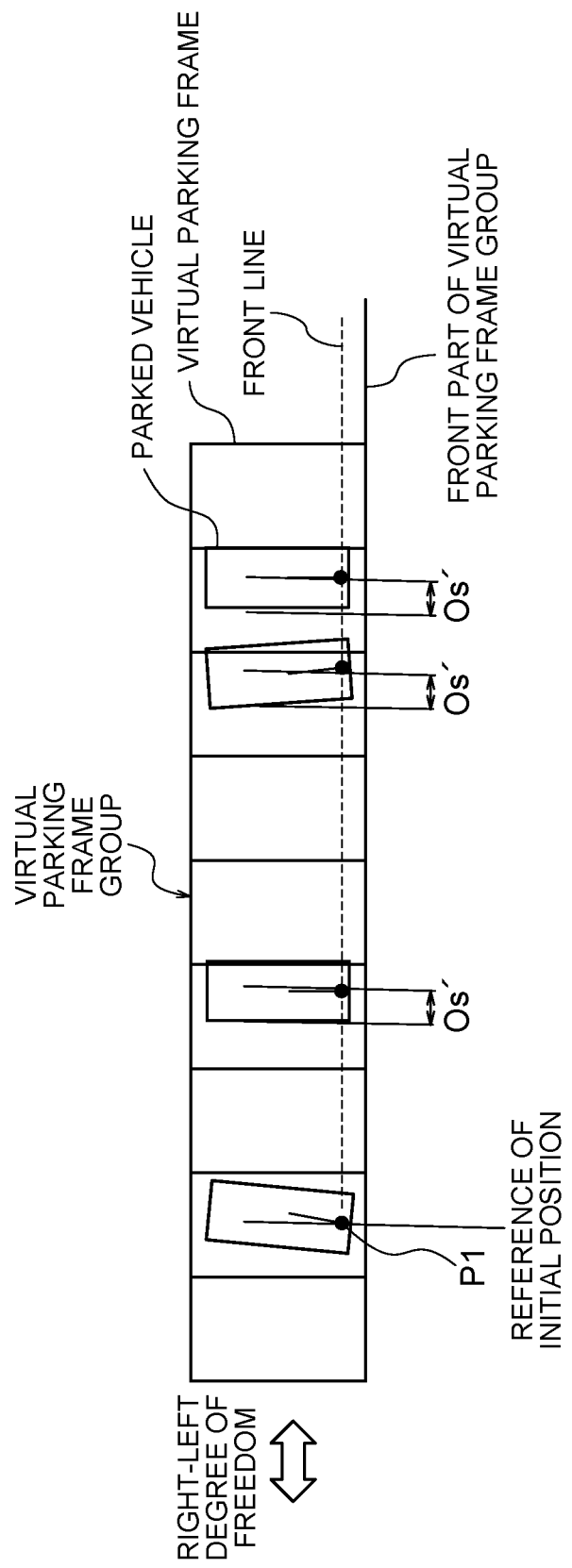

PARKING SUPPORT METHOD AND DEVICE

CROSS-REFERENCE TO RELATED APPLICATION

The present application is based on Japanese Patent Application No. 2015-246111 filed on Dec. 17, 2015, the entire content of which is herein incorporated by reference.

TECHNICAL FIELD

The present invention relates to a parking assist method and a parking assist device.

BACKGROUND

A parking assist device equipped in a vehicle is known (see Japanese Patent Application JP2013-220802A, for example). This device operates to extract a cloud of reflection points determined as the same object using the output of a radar device equipped in the vehicle. When two clouds of reflection points are extracted and a space corresponding to two or more vehicles exists between the two clouds of reflection points, the parking assist device operates to divide the space into two or more spaces and set a plurality of target parking positions in the spaces.

Thus, the parking assist device described in Japanese Patent Application JP2013-220802A merely divides the space corresponding to two or more vehicles into two or more spaces which may be located between parked vehicles. In some cases such as when the parked vehicles are located on the right or left in the parking frames, therefore, a plurality of parking frames cannot be appropriately set between the parked vehicles, which may be problematic.

SUMMARY

A problem to be solved by the present invention is to provide a parking assist method and a parking assist device with which parking frames can be appropriately set.

The present invention solves the above problem through setting a virtual parking frame group in which a parking frame group comprising a plurality of parking frames is virtualized, selecting representative points set at the same positions of the recognized plurality of parked vehicles, aligning virtual parking frames of the virtual parking frame group with respect to the representative points of the parked vehicles so that distances between positions of the representative points and predetermined positions of the parking frames closest to those positions are less than a predetermined value for all the representative points and all the parking frames, thereby to align the virtual parking frame group, the virtual parking frames overlapping the parked vehicles, and determining the aligned virtual parking frame group as the parking frame group comprising the plurality of parking frames.

According to the present invention, the configuration of the parking frame group is virtualized and the virtualized parking frame group is then aligned to the parked vehicles. This can suppress the occurrence of errors in setting of parking frames due to positions of the parked vehicles in the parking frames. An effect is thus obtained that the parking frames can be appropriately set.

BRIEF DESCRIPTION OF THE DRAWINGS

FIG. 9 is a diagram for describing a method of generating a virtual parking frame group;

FIG. 10A is a diagram for describing a method of setting the position of a virtual parking frame group in the right-angle parking scheme;

DETAILED DESCRIPTION

Figure 1:
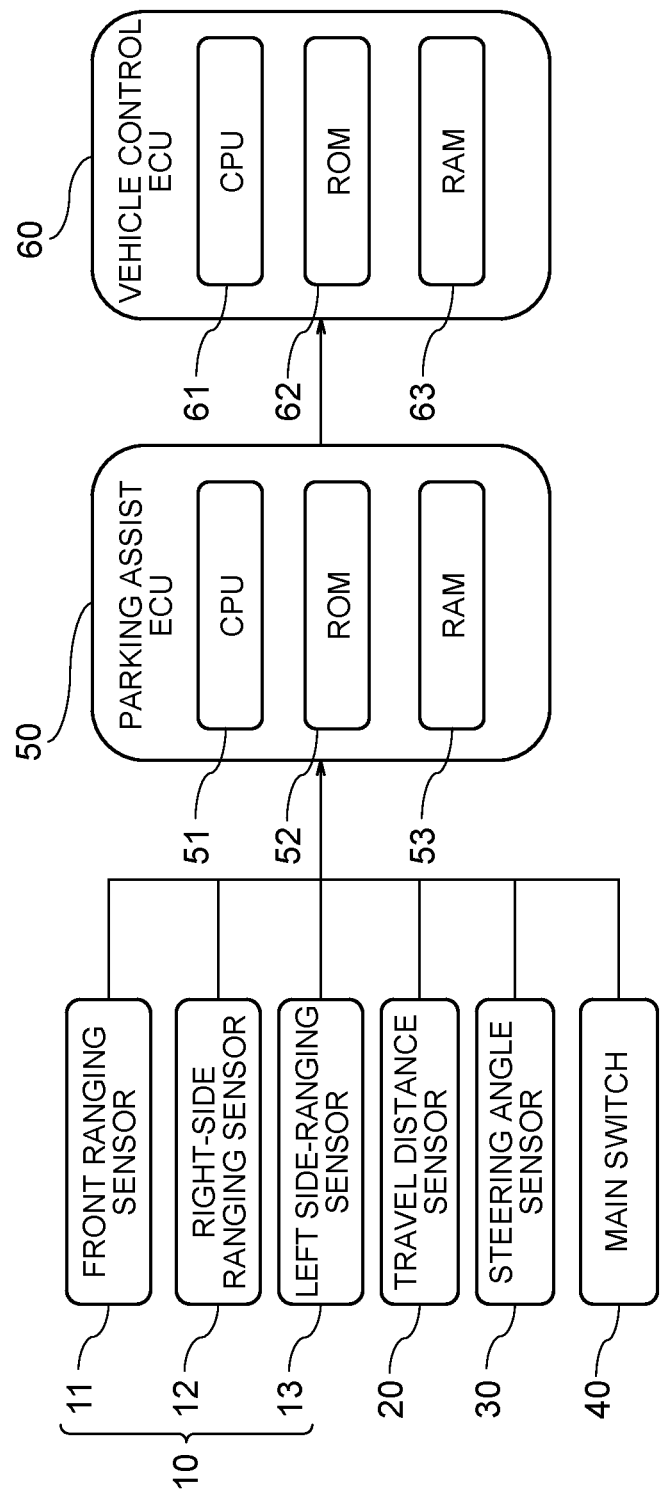
FIG. 1 is a block diagram illustrating the configuration of a parking assist device according to one or more embodiments of the present invention.

FIG. 1 is a block diagram illustrating the configuration of a parking assist device 100 according to one or more embodiments of the present invention. The parking assist device 100, which is equipped in a vehicle, assists an operation of moving (parking) the vehicle into a parking space. The parking assist device 100 includes a set of ranging sensors 10, a travel distance sensor 20, a steering angle sensor 30, a main switch 40, a parking assist electronic control unit (ECU) 50, and a vehicle control ECU 60. The parking assist device 100 further includes hardware modules, such as an engine control ECU and a power assist ECU (not illustrated), which are usually equipped in the vehicle. These components are connected to one another via a controller area network (CAN) or other in-vehicle LAN to mutually exchange information.

As illustrated in the figure, the set of ranging sensors 10 includes, for example, a front ranging sensor 11, a right-side ranging sensor 12, and a left side-ranging sensor 13. The front ranging sensor 11, which is provided at or in the vicinity of the front bumper of the vehicle (subject vehicle), detects the polar coordinates (distances and orientations) of a cloud of reflection points P0 (see FIG. 3) of an object existing ahead of the subject vehicle and outputs them to the parking assist ECU 50. The right-side ranging sensor 12, which is provided at the right side of the subject vehicle (e.g. at the front right part of the subject vehicle), detects the polar coordinates of a cloud of reflection points P0 of an object existing on the right side of the subject vehicle and outputs them to the parking assist ECU 50. The left-side ranging sensor 13, which is provided at the left side of the subject vehicle (e.g. at the front left part of the subject vehicle), detects the polar coordinates of a cloud of reflection points P0 of an object existing on the left side of the subject vehicle and outputs them to the parking assist ECU 50.

Examples of the ranging sensors 10 include laser scanners, radars, and stereo cameras. Any sensor can be employed as each ranging sensor, provided that it can detect the polar coordinates of a cloud of reflection points P0 of an object. The detection area of the set of ranging sensors 10 is set so as to be able to detect the polar coordinates of clouds of reflection points P0 of a plurality of objects that exist on the right and left of the route for the subject vehicle.

The travel distance sensor 20 calculates the movement amount of the subject vehicle and outputs it to the parking assist ECU 50. The travel distance sensor 20 can be configured using an appropriate sensor, such as a rotation speed sensor that detects the rotation speed of one or more wheels of the subject vehicle.

The steering angle sensor 30, which is equipped inside the steering column, for example, detects the rotation angle of the steering wheel and outputs it to the parking assist ECU 50.

The main switch 40, which is a switch for a user to operate to input the start of parking assist, outputs an OFF signal to the parking assist ECU 50 when not operated and outputs an ON signal to the parking assist ECU 50 when operated. The main switch 40 is disposed on an appropriate position at which the driver can operate it, such as a position around the instrument panel and steering wheel of the subject vehicle. Examples of the main switch 40 also include a software switch presented on the screen of a navigation devise and a software switch presented on the screen of a portable terminal, such as a smartphone, which can communicate with the vehicle via a network.

The parking assist ECU 50 is a controller that integrally controls the parking assist device 100. The parking assist ECU 50 comprises a ROM 52 that stores a parking assist program, a CPU 51 as an operation circuit that executes the program stored in the ROM 52 to serve as the parking assist device 100 according to one or more embodiments of the present invention, and a RAM 53 that serves as an accessible storage device. The parking assist ECU 50, to which the detection information is input from the set of ranging sensors 10, the travel distance sensor 20, the steering angle sensor 30, and the main switch 40, executes a parking assist process to be described later, then calculates a target vehicle speed and target steering angle of the subject vehicle, and outputs them to the vehicle control ECU 60.

The vehicle control ECU 60 is a controller that performs drive control of the vehicle. The vehicle control ECU 60 comprises a ROM 62 that stores a vehicle drive control program, a CPU 61 as an operation circuit that serves as a vehicle control device, and a RAM 63 that serves as an accessible storage device. The vehicle control ECU 60, to which the target vehicle speed and target steering angle of the vehicle are input from the parking assist ECU 50, performs the drive control of the vehicle in cooperation with the engine control ECU, the power assist ECU of the steering, etc.

Figure 2:
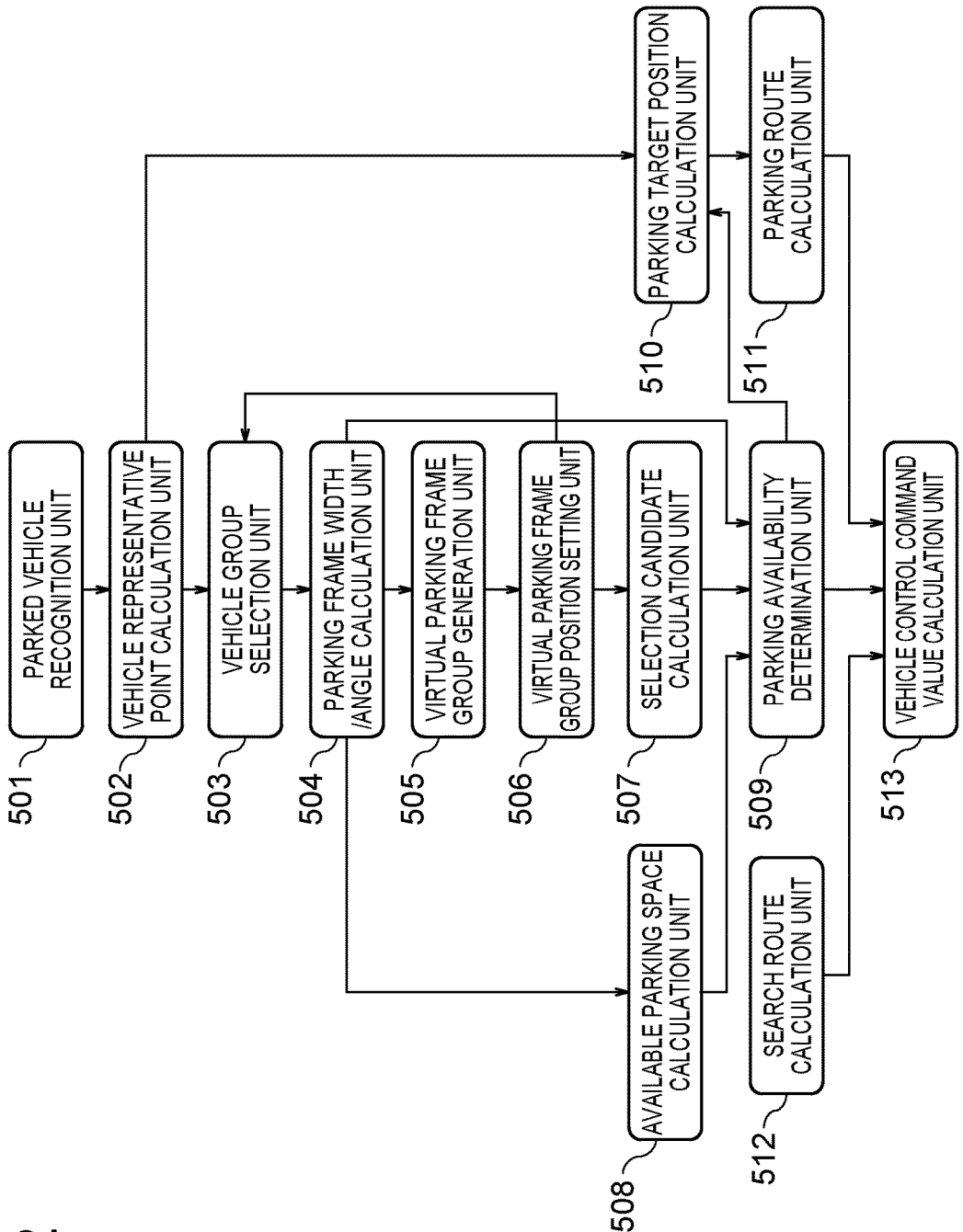
FIG. 2 is a block diagram for describing functions of a parking assist ECU.

FIG. 2 is a block diagram for describing the functions of the parking assist ECU 50. As illustrated in the figure, the parking assist ECU 50 comprises a parked vehicle recognition unit 501, a vehicle representative point calculation unit 502, a vehicle group selection unit 503, a parking frame width/angle calculation unit 504, a virtual parking frame group generation unit 505, a virtual parking frame group position setting unit 506, a selection candidate calculation unit 507, an available parking space calculation unit 508, a parking availability determination unit 509, a parking target position calculation unit 510, a parking route calculation unit 511, a search route calculation unit 512, and a vehicle control command value calculation unit 513.

The parked vehicle recognition unit 501 recognizes parked vehicles on the basis of reflection point positional information groups (referred to as "point clouds," hereinafter) that are input as clouds of polar coordinates from the set of ranging sensors 10. The parked vehicle recognition unit 501 first performs coordinate conversion on the point clouds, which are input from the front ranging sensor 11, the right-side ranging sensor 12, and the left side-ranging sensor 13, from the polar coordinates to the xy-plane coordinates for integration and then performs clustering to extract point clouds of close points.

Figure 3:
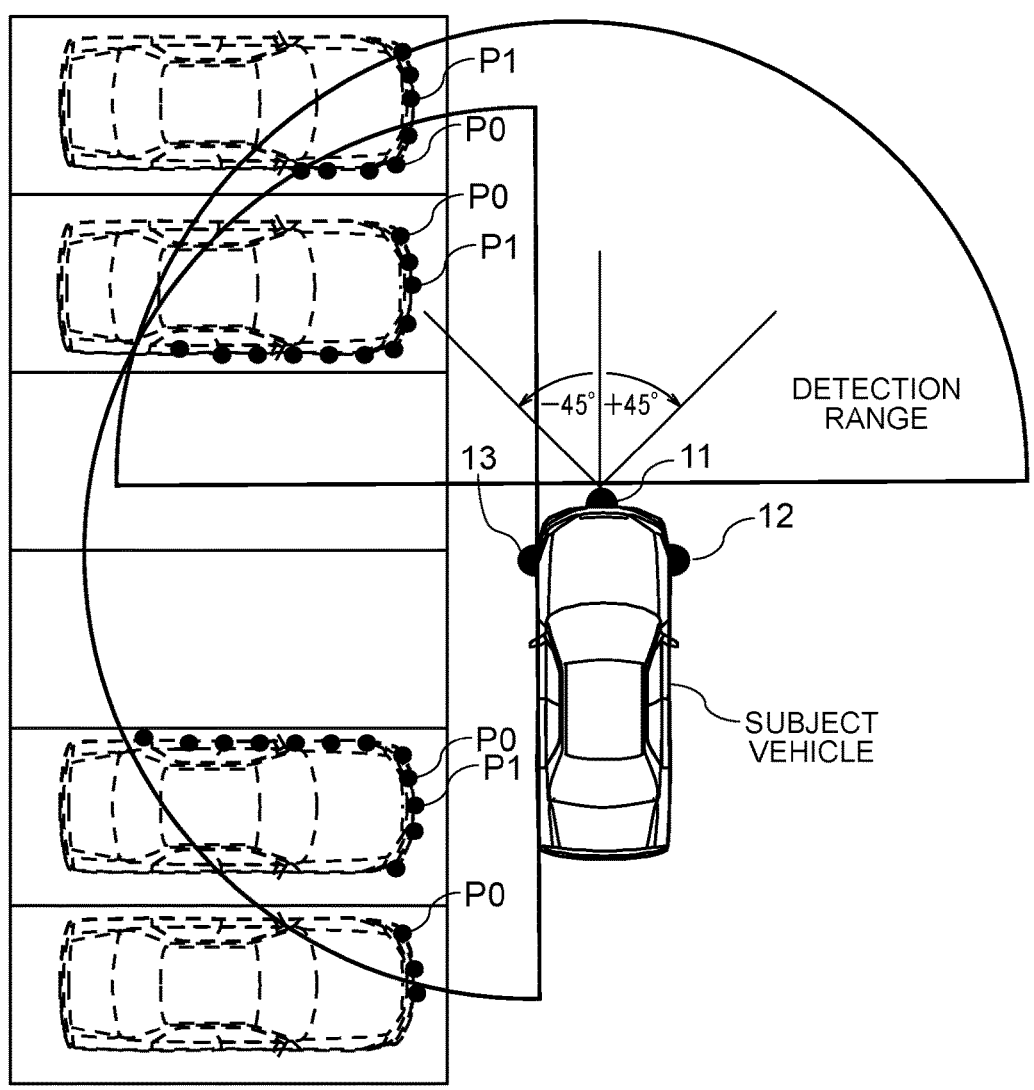
FIG. 3 is a plan view illustrating a state in which a recognition process for parked vehicles is executed in a parking lot of a right-angle parking scheme.

FIG. 3 is a plan view illustrating a state in which the recognition process for parked vehicles is executed in a parking lot of a right-angle parking scheme. As illustrated in the figure, when parked vehicles exist in the parking lot of the right-angle parking scheme, the parked vehicles are each extracted as an L-shaped point cloud by the parked vehicle recognition unit 501. Referring again to FIG. 2, when point clouds extracted by performing the clustering are each in an L shape (a figure of L), the parked vehicle recognition unit 501 outputs the information on the extracted point clouds to the vehicle representative point calculation unit 502. The method of recognizing the parked vehicles is not limited to the above-described method, and other known methods can also be used.

The vehicle representative point calculation unit 502 calculates a representative point P1 of each parked vehicle on the basis of the information on the point cloud input from the parked vehicle recognition unit 501. The vehicle representative point calculation unit 502 first extracts a straight line representing the front face of a parked vehicle parked in the backward direction or the rear face of a parked vehicle parked in the forward direction, and then calculates the center point of the extracted straight line as a representative point P1 of the parked vehicle.

Here, one of a pair of the L-shaped straight lines is a straight line representing the front face of a parked vehicle parked in the backward direction or the rear surface of a parked vehicle parked in the forward direction, and the other straight line is a straight line representing a side surface of the parked vehicle. As illustrated in FIG. 3, in a situation in which the vector indicating the direction of the subject vehicle and the vector indicating the direction of a parked vehicle are at a right angle, the front face of a parked vehicle parked in the backward direction or the rear surface of a parked vehicle parked in the forward direction falls within a range from 45° on the left side to 45° on the right side with respect to the vector indicating the direction of the subject vehicle. The vehicle representative point calculation unit 502 therefore extracts a straight line that falls within a range from 45° on the left side to 45° on the right side with respect to the vector indicating the direction of the subject vehicle as a straight line representing the front face of a parked vehicle parked in the backward direction or the rear surface of a parked vehicle parked in the forward direction. Then, the vehicle representative point calculation unit 502 calculates the center point of the extracted straight line as the representative point P1 of the parked vehicle, and outputs it to the vehicle group selection unit 503.

The vehicle representative point calculation unit 502 calculates not only the position of the representative point P1 of the parked vehicle but also the direction of the parked vehicle on the basis of the direction of the straight line representing the front face or rear face of the parked vehicle and the direction of the straight line representing the side surface of the parked vehicle and outputs the information on the position of the representative point P1 of the parked vehicle and the direction of the parked vehicle to the vehicle group selection unit 503. It is not essential to set the representative point P1 of the parked vehicle at the center of the front face or rear face of the parked vehicle, and it suffices that the representative point P1 is set at the same position for a plurality of parked vehicles. For example, the representative point P1 may be set at the right or left end of the front of the parked vehicle or may also be set at the center (center of gravity) of the parked vehicle or the like.

On the basis of the information on the position of the representative point P1 and direction of each parked vehicle input from the vehicle representative point calculation unit 502, the vehicle group selection unit 503 selects a parked vehicle group existing in a parking frame group composed of a series of parking frames that are arranged in the same direction side by side. Then, the vehicle group selection unit 503 outputs the information on the position of the representative point P1 and direction of each parked vehicle that belongs to the selected parked vehicle group to the parking frame width/angle calculation unit 504, the available parking space calculation unit 508, and the search route calculation unit 512. In this operation, parked vehicles existing in parking frames having different directions are grouped into different parked vehicle groups. When parked vehicle groups exist on the right and left of the subject vehicle which is traveling while searching, the directions of the right and left parked vehicle groups are different by 180°, and the right and left parked vehicles are therefore grouped into different parked vehicle groups.

The method of grouping the parked vehicles is not limited to this. For example, the parked vehicles may be further finely grouped in accordance with whether or not the spacing between parked vehicles is within a predetermined distance (e.g. a distance that allows three vehicles to be parked between the parked vehicles), and when an object that is not a vehicle is recognized between parked vehicles, the parked vehicles may be grouped into separate parked vehicle groups with reference to the object as the border.

In addition or alternatively, the vehicle group selection unit 503 may sequentially execute the process of grouping the parked vehicles each time the information on the representative point P1 of each parked vehicle is input from the vehicle representative point calculation unit 502, but the present invention is not limited to this. For example, the process of grouping the parked vehicles may be executed while the information on the parked vehicles is continuously input (i.e., tracking is performed) so that the information is combined over time. Specifically, the movement amount (so-called odometry) of the subject vehicle is calculated on the basis of the detection information which is input from the travel distance sensor 20 and the steering angle sensor 30, and the previous information on the representative point P1 of the parked vehicle and the current information on the representative point P1 of the parked vehicle are integrated on the basis of the calculation result. In this operation, the information on the representative point P1 of the parked vehicle which was input until the previous time but is not input this time is also used. This allows the calculation process for the width of parking frames, which will be described later, to be executed using the information on many parked vehicles that fall outside the detection range of the set of ranging sensors 10, thus enhancing the stability of results of the calculation process for the width of the parking frames.

The parking frame width/angle calculation unit 504 calculates the width and angle of parking frames on the basis of the information on the positions and directions of the parked vehicles which are grouped into the same parked vehicle group, and outputs the width and angle to the parking availability determination unit 509. The information on the positions and directions of the parked vehicles is input from the vehicle group selection unit 503.

Figure 4:
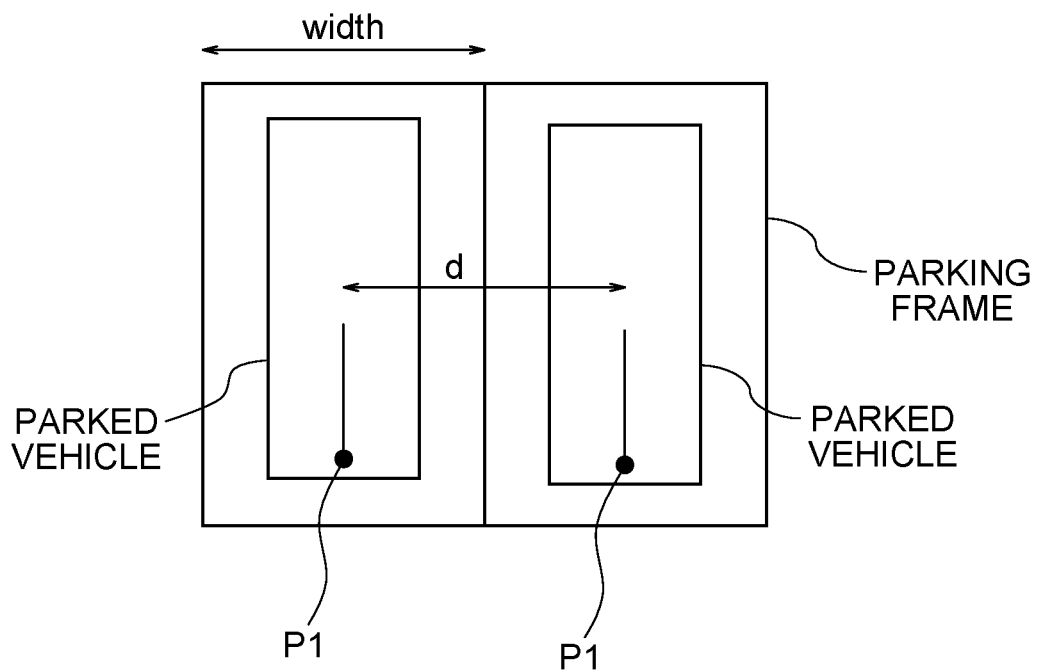
FIG. 4 is a diagram for describing the relationship between a width of parking frames and a unit distance between representative points.

FIG. 4 is a diagram for describing the relationship between a width of parking frames and a unit distance d between representative points. As illustrated in the figure, the width of parking frames is approximately identical with the distance d between the representative points P1 of two parked vehicles existing in the adjacent parking frames (this distance d is referred to as a "unit distance d between representative points," here and hereinafter).

Figure 5:
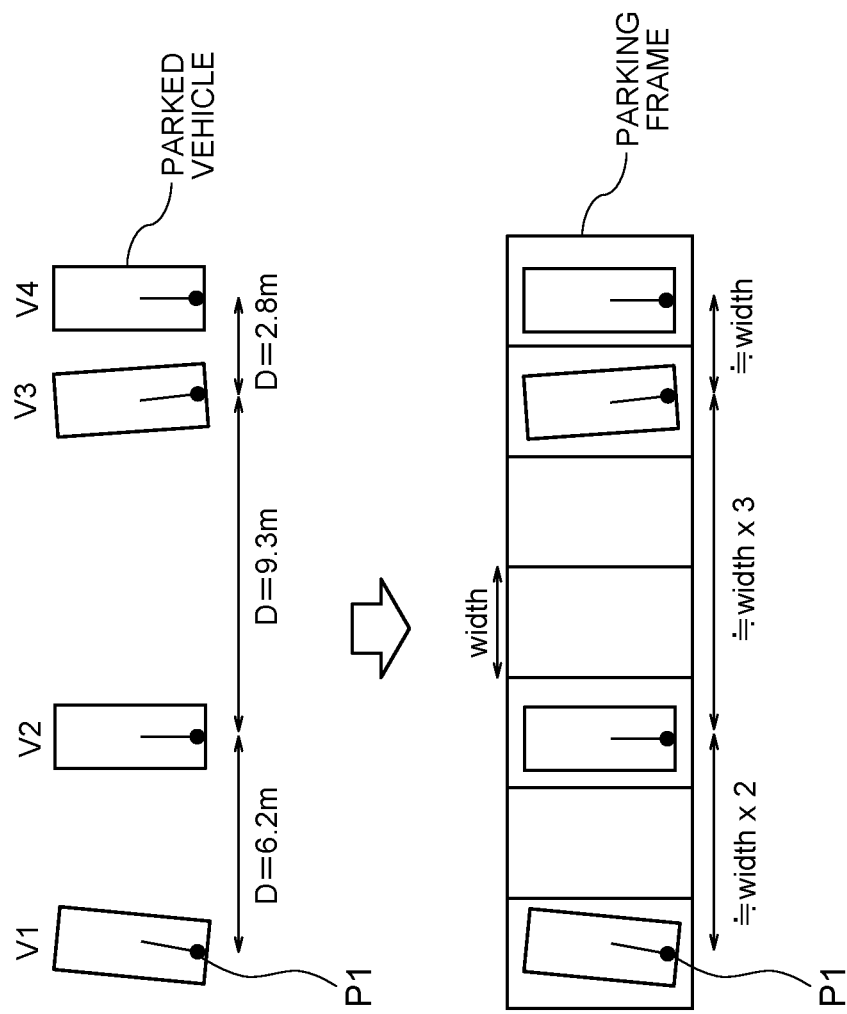
FIG. 5 is a diagram for describing the relationship between a width of parking frames and a distance between representative points when one or more empty parking frames exist between vehicles parked side by side.

FIG. 5 is a diagram for describing the relationship between a width of parking frames and a distance D between representative points when one or more empty parking frames exist between vehicles parked side by side. As illustrated in the figure, the distance D between representative points is approximately an integral multiple of the unit distance d between representative points (the width of parking frames). That is, the distance D between representative points of two parked vehicles existing in the parking frames adjacent to each other is equal to the unit distance d between representative points, the distance D between representative points of two parked vehicles existing in the parking frames adjacent to each other but with one parking frame therebetween is twice the unit distance d between representative points, and the distance D between representative points of two parked vehicles existing in the parking frames adjacent to each other but with two parking frames therebetween is three times the unit distance d between representative points.

The parking frame width/angle calculation unit 504 therefore calculates the width of parking frames using the unit distance d between representative points. Specifically, an assumed value dx is first set as the unit distance d between representative points. The assumed value dx is a value that corresponds to an actual width of parking frames (e.g. 2.2 m to 3.3 m).

Subsequently, for all the calculated distances D between representative points, an error de between each distance D between representative points and the assumed value dx is calculated. Calculation of the error de includes dividing the distance D between representative points by the assumed value dx to calculate a remainder dr. When the remainder dr is larger than $dx \times \frac{1}{2}$, the error de is calculated using the following equation (1). When the remainder dr is not larger than $dx \times \frac{1}{2}$, the error de is calculated using the following equation (2).

$$de = dx - dr \tag{1}$$

$$de = dr \quad (2)$$

Subsequently, a sum de_sum of the errors de calculated for the distances D between representative points is calculated. Then, the assumed value dx which gives the minimum sum de_sum of the errors is determined as the value of the unit distance d between representative points.

Some situations will now be discussed in which, as illustrated in FIG. 5, the vehicle group selection unit 503 selects four parked vehicles V1 to V4 as the parked vehicle group, the distance D12 between representative points of the parked vehicle V1 and the parked vehicle V2 is 6.2 m, the distance D23 between representative points of the parked vehicle V2 and the parked vehicle V3 is 9.3 m, and the distance D34 between representative points of the parked vehicle V3 and the parked vehicle V4 is 2.8 m.

A first case will be discussed in which the assumed value dx of the unit distance d between representative points is 3.0 m. In this case, the remainder dr for the distance D12 between representative points is 0.2 m, the remainder dr for the distance D23 between representative points is 0.3 m, and the remainder dr for the distance D34 between representative points is 2.8 m. Here, the remainder dr is not larger than dx×½ for the distances D12 and D23 between representative points; therefore, the error de of the distance D12 between representative points is 0.2 m and the error de of the distance D23 between representative points is 0.3 m. On the other hand, the remainder dr is larger than dx×½ for the distance D34 between representative points; therefore, the error de of the distance D34 between representative points is 0.2 m (3.0−2.8=0.2). Thus, the sum de_sum of the errors is 0.7 m.

A second case will be discussed in which the assumed value dx of the unit distance d between representative points is 3.1 m. In this case, the remainder dr for the distance D12 between representative points is 0.0 m, the remainder dr for the distance D23 between representative points is 0.0 m, and the remainder dr for the distance D34 between representative points is 2.8 m. Here, the remainder dr is not larger than dx×½ for the distances D12 and D23 between representative points; therefore, the error de of the distance D12 between representative points is 0.0 m and the error de of the distance D23 between representative points is 0.0 m. On the other hand, the remainder dr is larger than dx×½ for the distance D34 between representative points; therefore, the error de of the distance D34 between representative points is 0.3 m (3.1-2.8=0.3). Thus, the sum de_sum of the errors is 0.3 m.

A third case will be discussed in which the assumed value dx of the unit distance d between representative points is 3.2 m. In this case, the remainder dr for the distance D12 between representative points is 3.0 m, the remainder dr for the distance D23 between representative points is 2.9 m, and the remainder dr for the distance D34 between representative points is 2.8 m. Here, all the remainders dr are larger than dx×½; therefore, the error de of the distance D12 between representative points is 0.2 m (3.2-3.0=0.2), the error de of the distance D23 between representative points is 0.3 m (3.2-2.9=0.3), and the error de of the distance D34 between representative points is 0.4 m (3.2-2.8=0.4). Thus, the sum de_sum of the errors is 0.9 m.

Description will be omitted for the cases of the assumed value dx being 2.2 to 2.9 m and 3.3 m, but it has been confirmed that there are no cases in which the sum de_sum of the errors is less than 0.3 m. From the above, the sum de_sum of the errors is minimized when the assumed value dx of the unit distance d between representative points is 3.1 m, so the optimum value of the unit distance d between representative points is 3.1 m.

The method of using the distances D between representative points to calculate the width of parking frames has been described, but the present invention is not limited to this. For example, a straight line connecting a plurality of representative points P1 (referred to as a "front line," hereinafter) may be fitted using an appropriate scheme such as random sample consensus (RANSC), and the distance between the representative points P1 on the front line may be used.

Figure 6:
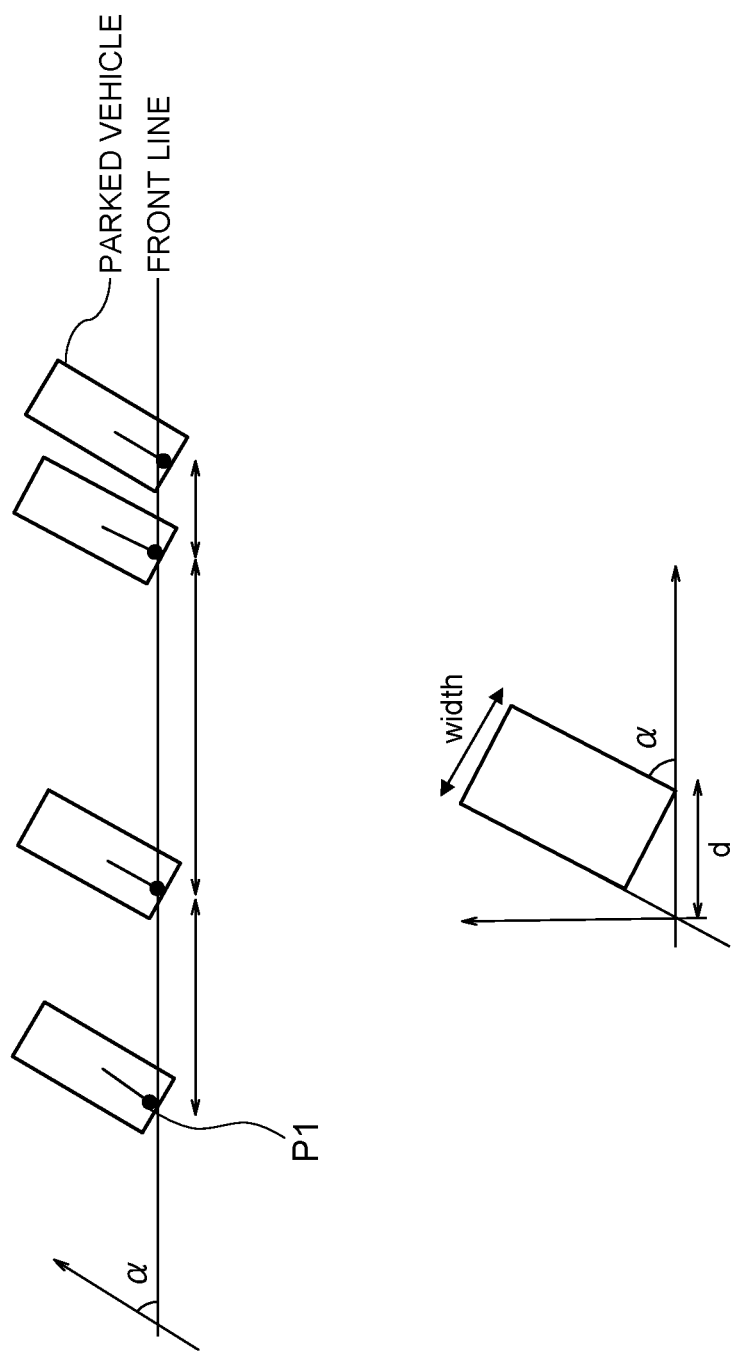
FIG. 6 is a diagram illustrating the relationship between a width of parking frames and an inclined angle of the parking frames with respect to a front line in the case of an angle parking scheme.

Subsequently, the width of parking frames is calculated. As illustrated in FIG. 5, in the case of the right-angle parking scheme which is not the angle parking scheme, the width direction of the parking frames and the arrangement direction of the parking frames are the same, and the width of the parking frames is therefore calculated as the unit distance d between representative points. On the other hand, in the case of the angle parking scheme as illustrated in FIG. 6, the width direction of the parking frames is inclined at a predetermined angle α with respect to the arrangement direction of the parking frames (the extending direction of the front line), and the width of the parking frames is therefore calculated as d×sin α.

In the case of the right-angle parking scheme, the angle α is 90° and the width of the parking frames is d×sin 90°=d, so the width of the parking frames can be calculated as d×sin α (width=d×sin α) as in the case of the angle parking scheme. However, detection of the directions of parked vehicles involves errors, and it is therefore preferred to calculate the width of the parking frames as the unit distance d between representative points (width=d) if the parking scheme can be determined as the right-angle parking scheme rather than the angle parking scheme.

In the case of a parking lot of the parallel parking scheme, the longitudinal dimension of the parking frames is calculated using the same method as the above-described method of calculating the width of the parking frames.

Referring again to FIG. 2, the parking frame width/angle calculation unit 504 calculates the angle α between the front line and an average value of directions of the parked vehicles grouped into the same parked vehicle group and outputs the angle α as the angle of the parking frames to the virtual parking frame group generation unit 505. The directions of the parked vehicles are input from the vehicle group selection unit 503. In the case of the right-angle parking scheme, the parking frame width/angle calculation unit 504 substitutes 90° or 0° for the angle α of the parking frames and outputs it to the virtual parking frame group generation unit 505. In the case of the angle parking scheme, the parking frame width/angle calculation unit 504 outputs the calculated value of α as the angle of the parking frames to the virtual parking frame group generation unit 505.

In the above description, the width and angle of the parking frames are acquired by calculating them on the basis of the positions and directions of the parked vehicles. In addition or alternatively, detailed information on the parking lot including the information on the width and angle of the parking frames may be retained so as to be included in the map information, or the information on the width and angle of the parking frames may be acquired via a network.

The virtual parking frame group generation unit 505 generates a virtual parking frame group (see FIGS. 7A to 7C) on the basis of the width and angle α of the parking frames input from the parking frame width/angle calculation unit 504. In the virtual parking frame group, a series of parking frames is virtualized.

Figure 7A:
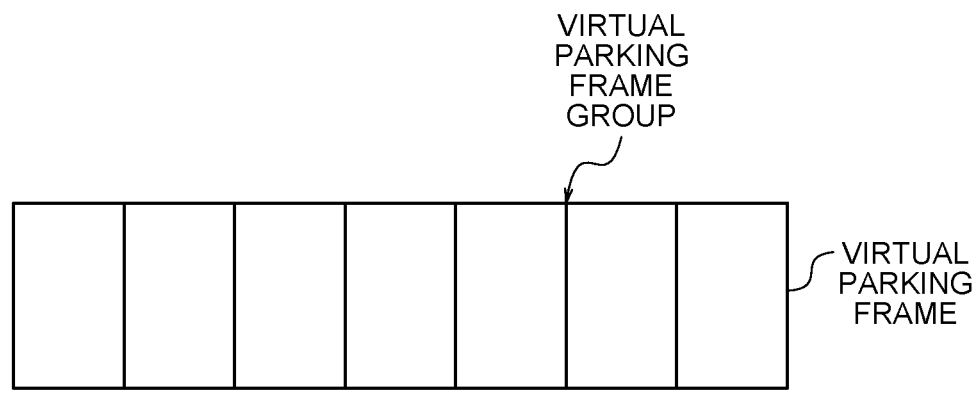
FIG. 7A is a diagram illustrating a virtual parking frame group in a right-angle parking scheme.
Figure 7B:
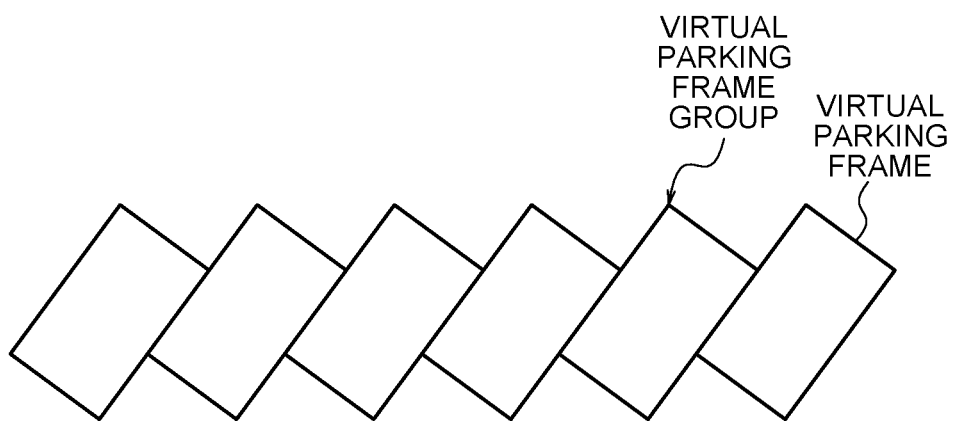
FIG. 7B is a diagram illustrating a virtual parking frame group in an angle parking scheme.
Figure 7C:
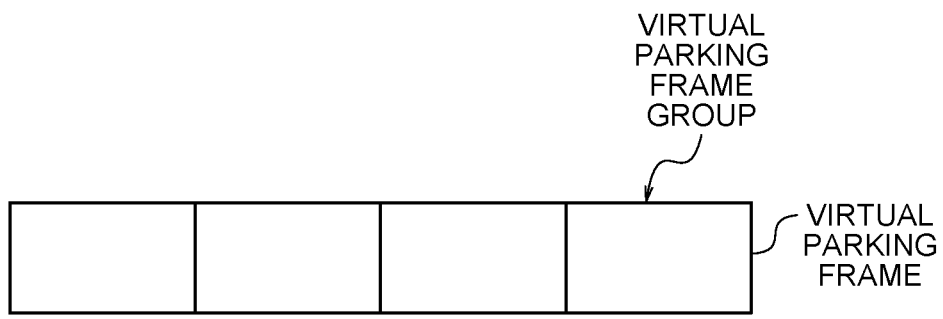
FIG. 7C is a diagram illustrating a virtual parking frame group in a parallel parking scheme.

FIG. 7A is a diagram illustrating the virtual parking frame group corresponding to the parking frame group in the right-angle parking scheme, FIG. 7B is a diagram illustrating the virtual parking frame group corresponding to the parking frame group in the angle parking scheme, and FIG. 7C is a diagram illustrating the virtual parking frame group corresponding to the parking frame group in the parallel parking scheme. As illustrated in these figures, the virtual parking frame group is configured such that a number of virtual parking frames having the same width, length, and angle are arranged along a predetermined straight line. As illustrated in FIG. 7A, the virtual parking frame group corresponding to the parking frame group in the right-angle parking scheme is a ladder-shaped frame group.

The width of the virtual parking frames of the virtual parking frame group illustrated in FIGS. 7A and 7B is the width which is input from the parking frame width/angle calculation unit 504, and the angle of the virtual parking frames of the virtual parking frame group illustrated in FIG. 7B is the angle α which is input from the parking frame width/angle calculation unit 504. The length (length in the direction perpendicular to the width direction) of the virtual parking frames of the virtual parking frame group illustrated in FIGS. 7A and 7B has a value that is preliminarily set in accordance with the length of a commonly-used parking frame.

Figure 8:
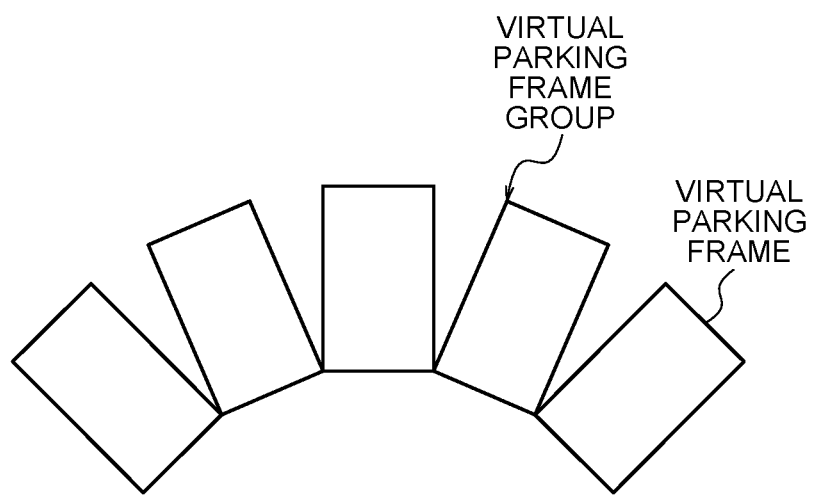
FIG. 8 is a diagram illustrating a virtual parking frame group in another parking scheme different than the parking schemes illustrated in FIG. 7A, FIG. 7B, and FIG. 7C.

In the above description, the width and angle of the virtual parking frames are the width and the angle α which are calculated by the parking frame width/angle calculation unit 504. In an alternative embodiment, they may be values that are preliminarily set. In this case, detailed information on the parking frame group including the width and angle of the parking frames may be retained so as to be included in the map information, and the retained width and angle of the parking frames may be set as the width and angle of the virtual parking frames. In addition or alternatively, the information on the width and angle of the virtual parking frames may be acquired via an appropriate network. This allows the virtual parking frame group to be generated which corresponds to the parking frame group in another parking scheme, as illustrated in FIG. 8, different than the right-angle parking scheme (see FIG. 7A), the angle parking scheme (see FIG. 7B), and the parallel parking scheme (see FIG. 7C).

It suffices that the number of the virtual parking frames included in the virtual parking frame group is the number of frames that are capable of accommodating all the parked vehicles of the parked vehicle group selected by the vehicle group selection unit 503, but it is preferred to add two frames on the right and left of the parked vehicle group as illustrated in FIG. 9. Thus, the number of the virtual parking frames included in the virtual parking frame group is preferably the number obtained by adding two to the number of frames capable of accommodating all the parked vehicles included in the parked vehicle group. This arrangement enables the determination of a parking frame existing in a space that is not located between parked vehicles.

Figure 10B:
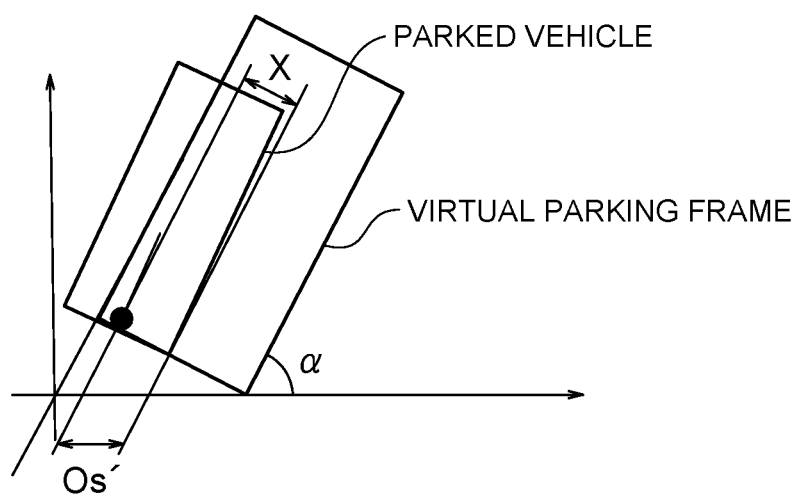
FIG. 10B is a diagram for describing a method of setting the position of a virtual parking frame groups in the angle parking scheme.

The virtual parking frame group position setting unit 506 sets the position of the virtual parking frame group, which is generated by the virtual parking frame group generation unit 505, in accordance with the positions of the parked vehicles of the parked vehicle group selected by the vehicle group selection unit 503. FIG. 10A is a diagram for describing a method of setting the position of the virtual parking frame group in the right-angle parking scheme while FIG. 10B is a diagram for describing a method of setting the position of the virtual parking frame group in the angle parking scheme. As illustrated in FIG. 10A, first, the virtual parking frame group position setting unit 506 offsets the front part of the virtual parking frame group slightly toward the near side with respect to the front line calculated by the parking frame width/angle calculation unit 504. The offset amount in this process may be set such that all the parked vehicles of the parked vehicle group fall inside the virtual parking frame group or may also be a value that is preliminarily set.

Subsequently, when setting the position of the virtual parking frame group in the right-left direction (arrangement direction of the parking frames), the virtual parking frame group position setting unit 506 first sets the initial position of the virtual parking frame group. This setting of the initial position includes, for example, aligning the representative point P1 of the parked vehicle located on the left end of the parked vehicle group with the center line in the width direction of the virtual parking frame located second from the left end of the virtual parking frame group.

In the parallel parking scheme, the setting of the initial position of the virtual parking frame group may include, for example, aligning the representative point P1 of the parked vehicle located on the rear end of the parked vehicle group with the center line in the longitudinal direction of the virtual parking frame located second from the rear end of the virtual parking frame group.

Subsequently, the virtual parking frame group position setting unit 506 calculates an offset amount Os between the position in the right-left direction of the virtual parking frame group set at the initial position and an optimum position in the right-left direction of the virtual parking frame group and moves (offsets) the virtual parking frame group in the right-left direction by the offset amount Os thereby to determine the position of the virtual parking frame group. In the process of calculating the offset amount Os, first, an offset amount Os' between the position of the representative point P1 and the center line in the vehicle width direction of the virtual parking frame closest to that position is calculated for all the parked vehicles. The average value of the calculated offset amounts Os' is then calculated and output as the offset amount Os.

In the case of the right-angle parking scheme, the distance between the position of the representative point P1 of each parked vehicle and the center line in the width direction of the virtual parking frame closest to that position is employed as the offset amount O'. In the case of the angle parking scheme as illustrated in FIG. 10B, the above offset amount O' is calculated as Os'=x/sin α. In this equation, x represents the distance between the position of the representative point P1 and the center line in the width direction of the virtual parking frame closest to that position.

In the case of the parallel parking scheme, the distance between the position of the representative point P1 of each parked vehicle and the center line in the longitudinal direction of the virtual parking frame closest to that position is employed as the offset amount O'. In the case of the parking lot of the parking scheme as illustrated in FIG. 8, the distance between the position of the center of each parked vehicle and the position of the center of the virtual parking frame closest to that position is calculated for all the parked vehicles, and the position of the virtual parking frame group may be optimized so as to minimize the error of the calculated distance.

As described above, in the parking assist ECU 50, the virtual parking frame group generation unit 505 generates the virtual parking frame group, the virtual parking frame group position setting unit 506 sets the position of the virtual parking frame group, and the configuration of the parking frame group is thereby determined.

The selection candidate calculation unit 507 calculates the parking frame of a selection candidate for a parking target position from among the parking frames included in the parking frame group of which the configuration is determined by the virtual parking frame group generation unit 505 and the virtual parking frame group position setting unit 506, and outputs the calculated parking frame to the parking availability determination unit 509. The parking frame of a selection candidate as referred to herein is a parking frame that is included in the parking frame group and that does not overlap the position of the parked vehicle recognized by the parked vehicle recognition unit 501.

The available parking space calculation unit 508 calculates a space in which no objects existing around the subject vehicle are present (i.e. an available parking space) on the basis of the information on the point clouds which is input from the set of ranging sensors 10, and outputs the available parking space to the parking availability determination unit 509. Examples of methods of detecting the available parking space include a method of calculating a so-called grid map (grid map obtained by dividing the space into grid-like spaces) using the simultaneous localization and mapping (SLAM) technique. The grid map indicates whether each space is empty or occupied.

The available parking space calculation unit 508 extracts the available parking space, for example, on the basis of the information on the front line of the parked vehicle group input from the parking frame width/angle calculation unit 504 and the calculated grid map. The grid map as used herein is made to include not only the information as to whether each space is open or occupied ("Open" or "Occupied") but also the information that each space is not detected by the set of ranging sensors 10 ("Unknown). That is, the grid map referred to by the parking availability determination unit 509 has three values of "Open," "Occupied," and "Unknown."

The parking availability determination unit 509 cross-checks the parking frame of each selection candidate output from the selection candidate calculation unit 507 with the available parking space output from the available parking space calculation unit 508 to determine whether parking is possible or not and outputs the determination result to the vehicle control command value calculation unit 513.

In the determination as to whether parking is possible or not, a determination may be made that parking is possible only when the entire area of each parking frame is "Open," or a determination may be made that parking is possible even when the space is "Unknown" rather than "Open" unless the space is "Occupied." By determining that parking is possible even when the space is "Unknown" unless the space is "Occupied," it is possible to prevent delays in the determination of parking possibility, and natural forward parking can be achieved as if a person drives the vehicle.

In addition or alternatively, a determination may be made as to whether parking is possible or not, on the basis of the information on the width of the parking frames input from the parking frame width/angle calculation unit 504, the information on the available parking space input from the available parking space calculation unit 508, and the information on the vehicle width v_width of the subject vehicle. Specifically, a determination may be made as to whether parking is possible or not, as described below.

First, the parking availability determination unit 509 compares the vehicle width v_width of the subject vehicle with the width of the parking frames and makes a determination that parking of the subject vehicle into the available parking space is not possible when the condition of the following expression (3) is satisfied.

$$v\_width < width + width\_threshold \quad (3)$$

The width_threshold is a value that is preliminarily set to ensure a space necessary for getting on and off the subject vehicle in the available parking space. Here, when it is unnecessary to take into account the getting on and off of a person, such as in the case of automated driving, the width_threshold may be set small.

Subsequently, the parking availability determination unit 509 calculates a width area_width when the available parking space is projected onto the front line, and makes a determination that parking of the subject vehicle into the available parking space is not possible when the condition of the following expression (4) is satisfied. That is, the parking availability determination unit 509 determines whether or not the width of the available parking space is sufficient.

$$v\_width < area\_width + width\_threshold \quad (4)$$

The parking target position calculation unit 510 selects one of the parking frames of selection candidates into which the parking availability determination unit 509 determines that parking is possible, and offsets the position of the selected parking frame. Then, the parking target position calculation unit 510 calculates the parking target position in the offset parking frame. Examples of the method of selecting one of a plurality of parking frames of selection candidates include a method of selecting a parking frame that is closest to the subject vehicle.

Examples of the method of offsetting the position of the selected parking frame include a method of using the position of the representative point P1 of the parked vehicle as in the method of setting the position of the virtual parking frame group performed by the virtual parking frame group position setting unit 506. That is, when parked vehicles exist on the right and left of the selected parking frame, for each of these two parked vehicles, an offset amount Os' between the position of the representative point P1 and the center line in the vehicle width direction of the parking frame closest to that position is calculated. Then, the selected parking frame is moved (offset) by the average value of the offset amounts Os'. When the parking frame at the end of the parking frame group is selected, for each of the two parked vehicles adjacent to the parking frame, an offset amount Os' between the position of the representative point P1 and the center line in the vehicle width direction of the parking frame closest to that position is calculated. Then, the selected parking frame is moved (offset) by the average value of the offset amounts Os'.

Examples of the method of calculating the parking target position include a method of setting it to the center back side of the selected available parking space.

The parking route calculation unit 511 calculates a parking route to the target parking position which is input from the parking target position calculation unit 510. The method of calculating the parking route is not particularly limited, and various known methods can be used.

The search route calculation unit 512 calculates a travel route for searching for an available parking space when parking was not possible. The available parking space is searched using the information on the front line which is input from the parking frame width/angle calculation unit 504. For example, a basic travel line is created by offsetting the front line to the travel route side of the vehicle, and a route for traveling along the basic travel line from the current position of the subject vehicle is calculated. In this case, the subject vehicle travels along a series of parking frames.

On the basis of the information input from the parking availability determination unit 509 as to whether or not parking of the subject vehicle into the available parking space is possible, the vehicle control command value calculation unit 513 calculates a vehicle control command value for traveling along the parking route input from the parking route calculation unit 511 when parking is possible, and calculates a vehicle control command value for traveling along the search route, which is input from the search route calculation unit 512, when parking is not possible. Then, the vehicle control command value calculation unit 513 outputs the calculated vehicle control command value to the vehicle control ECU 60. Examples of the vehicle control command value include the target vehicle speed and the target steering angle, for example, but other command values such as the acceleration of the subject vehicle may be included therein. The method of calculating the vehicle control command value is not particularly limited, and various known methods can be used.

Figure 11:
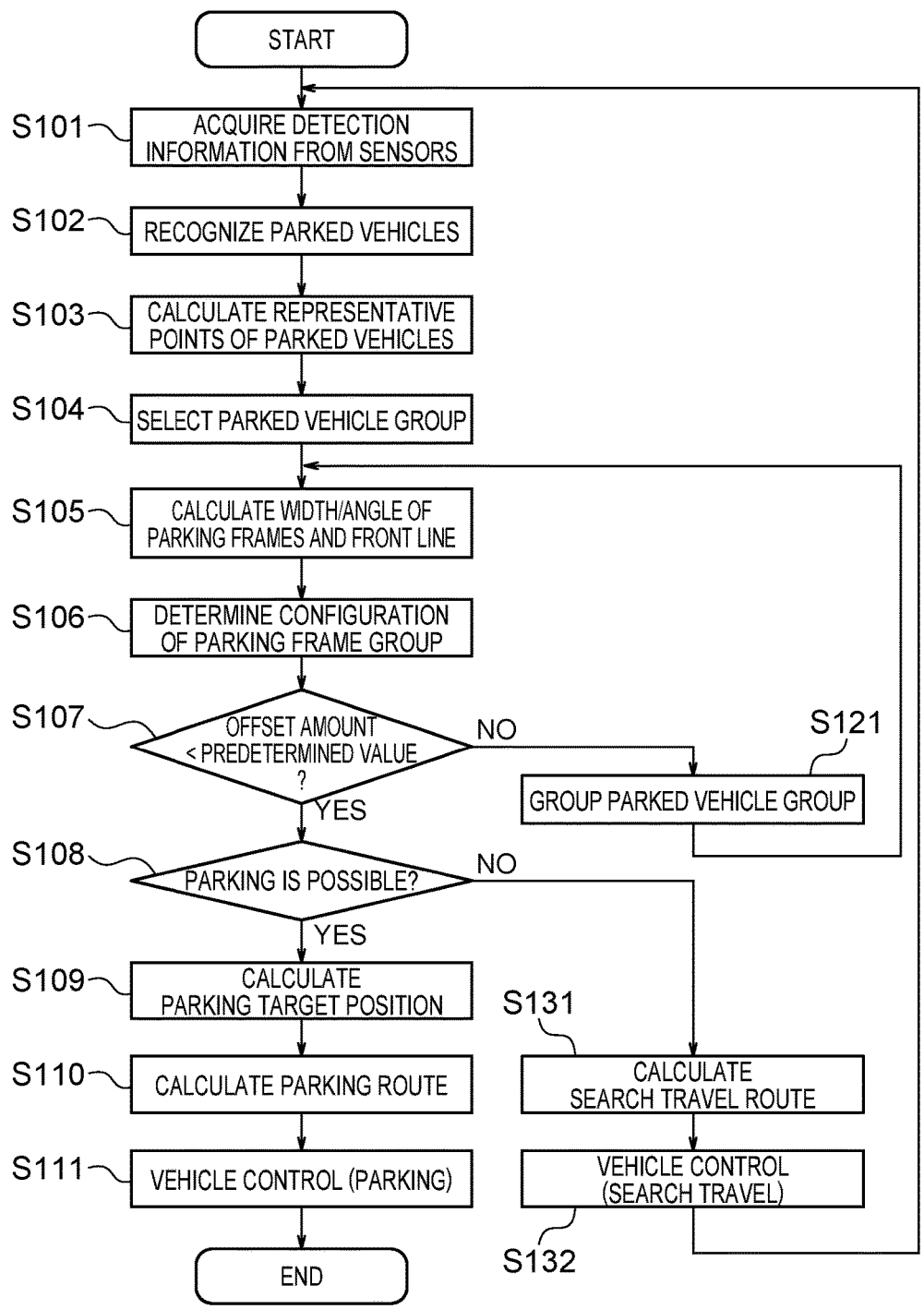
FIG. 11 is a flowchart illustrating the control procedure of a parking assist process executed by the parking assist device according to one or more embodiments of the present invention.

FIG. 11 is a flowchart illustrating the control procedure of a parking assist process executed by the parking assist device 100 according to one or more embodiments of the present invention. When an ON signal is input from the main switch 40 to the parking assist ECU 50, the parking assist process is started, which is followed by step S101.

In step S101, detection information is input from the set of ranging sensors 10, the travel distance sensor 20, and the steering angle sensor 30 to the parking assist ECU 50. Then, in step S102, the parked vehicle recognition unit 501 recognizes the parked vehicles on the basis of the information on the point clouds which is input as clouds of polar coordinates from the set of ranging sensors 10.

Then, in step S103, the vehicle representative point calculation unit 502 calculates the representative point P1 of each parked vehicle on the basis of the information on the point clouds which is input from the parked vehicle recognition unit 501. Then, in step S104, the vehicle group selection unit 503 selects a parked vehicle group existing in a series of parking frames of which the directions and the like are the same, on the basis of the information on the position of the representative point P1 and direction of each parked vehicle, which information is input from the vehicle representative point calculation unit 502.

Then, in step S105, the parking frame width/angle calculation unit 504 calculates the width and angle α of the parking frames and the front line on the basis of the information on the positions and directions of the parked vehicles which are grouped into the same parked vehicle group, which information is input from the vehicle group selection unit 503. Then, in step S106, the virtual parking frame group generation unit 505 generates the virtual parking frame group, the virtual parking frame group position setting unit 506 sets the position of the virtual parking frame group, and the configuration of the parking frame group is thereby determined.

In step S107, the vehicle group selection unit 503 cross-checks the parking frame group having the configuration determined in step S106 with the parked vehicle group selected in step S104 and determines whether the offset amount between the position of the representative point P1 and the center line of the parking frame closest to that position is not less than a predetermined value. When the offset amount is less than the predetermined value, the routine proceeds to step S108 while when the offset amount is not less than the predetermined value, the routine proceeds to step S121.

In step S121, the vehicle group selection unit 503 groups the parked vehicle group selected in step S104 into a plurality of parked vehicle groups. Then, the routine returns to step S105.

Figure 12:
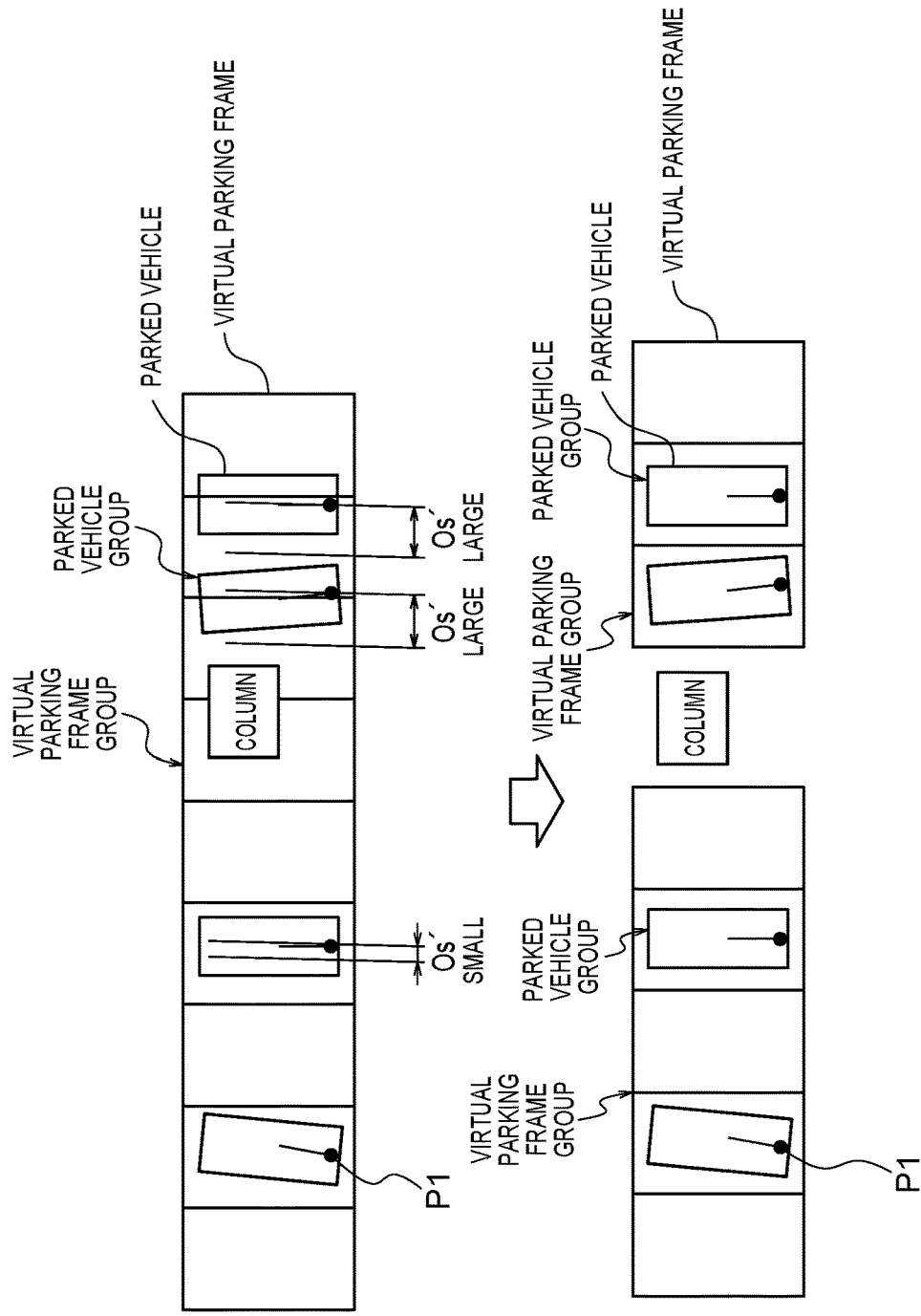
FIG. 12 is a diagram illustrating a specific example in the case of grouping a parked vehicle group into two parked vehicle groups.

FIG. 12 is a diagram illustrating a specific example in the case of grouping the parked vehicle group into two parked vehicle groups. As illustrated in the figure, the initial setting includes first aligning the position of the representative point P1 of the parked vehicle located on the left end (or right end) of the parked vehicle group with the position of the center line in the width direction of the parking frame closest to that position. Then, the offset amount Os' between the position of the representative point P1 and the center line in the width direction of the parking frame closest to that position is calculated for all the parked vehicles.

Here, when the configuration of the parking frame group varies, such as when the parking frame group is divided due to the presence of an obstacle such as a column, for example, as illustrated in FIG. 12, the offset amount Os' increases sharply at the position as the boundary at which the configuration varies. The parked vehicle group is therefore grouped into two parked vehicle groups with reference to the position as the boundary at which the offset amount Os' increases sharply.

In the case of the parking frame group of the parallel parking scheme, the initial setting includes aligning the position of the representative point P1 of the parked vehicle located on the tail (or head) of the parked vehicle group with the position of the center line in the longitudinal direction of the parking frame closest to that position. Then, the offset amount Os' between the position of the representative point P1 and the center line in the longitudinal direction of the parking frame closest to that position is calculated for all the parked vehicles.

Then, in step S108, the parking availability determination unit 509 cross-checks the parking frame of each selection candidate output from the selection candidate calculation unit 507 with the available parking space output from the available parking space calculation unit 508 to determine whether parking is possible or not. When a determination is made that parking is possible, the routine proceeds to step S109 while when a determination is made that parking is not possible, the routine proceeds to step S131.

In step S131, the search route calculation unit 512 calculates the travel route for searching for an available parking space using the information on the front line which is input from the parking frame width/angle calculation unit 504. Then, in step S132, the vehicle control command value calculation unit 513 calculates the vehicle control command value for traveling along the travel route for search which is input from the search route calculation unit 512, and the vehicle control ECU 60 executes the drive control for the vehicle in accordance with the vehicle control command value which is input from the vehicle control command value calculation unit 513.

On the other hand, in step S109, the parking target position calculation unit 510 selects one of the parking frames of selection candidates into which the parking availability determination unit 509 determines that parking is possible, and offsets the position of the selected parking frame. Then, the parking target position calculation unit 510 calculates the parking target position in the offset parking frame.

Then, in step S110, the parking route calculation unit 511 calculates the parking route to the target parking position which is input from the parking target position calculation unit 510. Then, in step S111, the vehicle control command value calculation unit 513 calculates the vehicle control command value for traveling along the parking route which is input from the parking route calculation unit 511, and the vehicle control ECU 60 executes the drive control for the vehicle in accordance with the vehicle control command value which is input from the vehicle control command value calculation unit 513. Thus, the parking assist process is completed.

Figure 13:
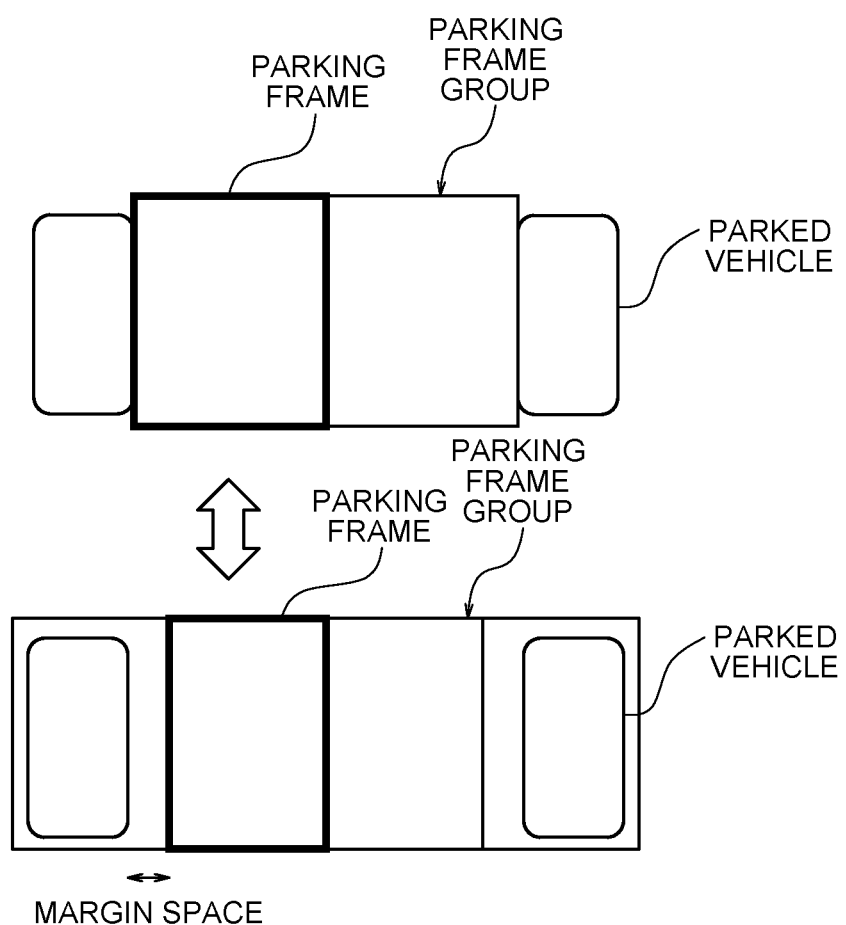
FIG. 13 is a diagram for describing a comparative example of a method of determining a parking frame group.

As illustrated in FIG. 13, in the parking frames, margin spaces exist between the parking frames and the parked vehicles. If the available parking space located between the right and left parked vehicles is merely divided in a simple manner, widths of the parking frames will be set wider than the actual widths by the margin spaces. In a parking frame between the right and left parked vehicles, therefore, the position of the center line in the vehicle width direction of the parking frame is set to deviate to the right or left from the actual position. In particular, if the right and left parked vehicles are located on the right or left in the parking frames, the error of the setting position of the parking frame between the parked vehicles will be large.

In contrast, in the parking assist method and parking assist device 100 according to one or more embodiments of the present invention, the recognition information about the parked vehicles is acquired, and the virtual parking frame group is set and aligned to the recognized parked vehicles. Then, the virtual parking frame group aligned to the recognized parked vehicles is determined as the parking frame group. Through this operation, widths of the parking frames between the parked vehicles can be appropriately set in accordance with the actual widths regardless of the existence of margin spaces, and positions of the parking frames can be appropriately set in accordance with the actual positions.

Figure 14:
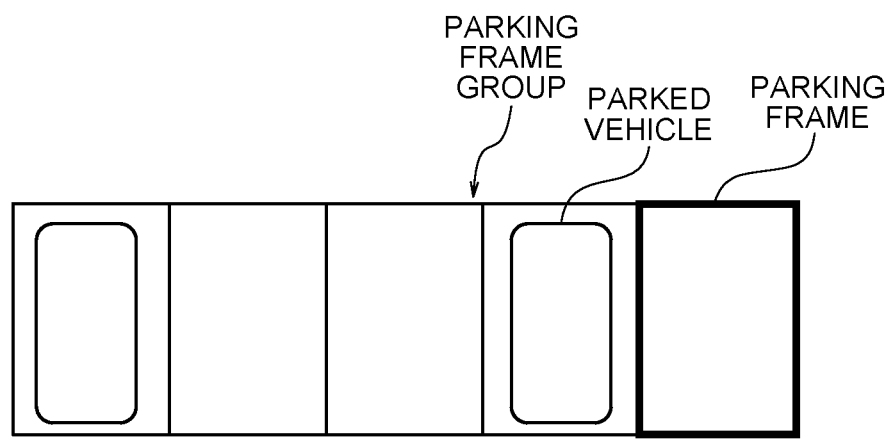
FIG. 14 is a diagram for describing a comparative example of a method of determining a parking frame group.

In some cases, a parking frame that is not located between parked vehicles may exist as illustrated in FIG. 14. To cope with this situation, in the parking assist method and parking assist device 100 according to one or more embodiments of the present invention, the virtual parking frame group is set in which one virtual parking frame is added to each of both sides of the parked vehicle group, and a parking frame that is not located between parked vehicles can thereby be determined (see FIG. 9).

In the parking assist method and parking assist device 100 according to one or more embodiments of the present invention, the virtual parking frame group is set which comprises a plurality of virtual parking frames that have the same width size and longitudinal size and are arranged side by side or parallel along a predetermined straight line. This allows the parking frame group to be determined in any of the right-angle parking scheme (see FIG. 7A), the angle parking scheme (see FIG. 7B), and the parallel parking scheme (see FIG. 7C).

In the parking assist method and parking assist device 100 according to one or more embodiments of the present invention, the process of setting the virtual parking frame group of the right-angle parking scheme or the angle parking scheme includes calculating the distance D between representative points which is a distance between the representative points P1 adjacent to each other, calculating the width of the parking frames on the basis of the distance D between representative points, and employing the calculated width of the parking frames as the width of the virtual parking frames (see FIG. 5). Through this operation, even when the width of parking frames in each parking lot is not known, the virtual parking frame group of the right-angle parking scheme or the angle parking scheme can be set, and the parking frame group of the right-angle parking scheme or the angle parking scheme can be determined.

In addition or alternatively, the process of setting the virtual parking frame group of the right-angle parking scheme or the angle parking scheme includes setting the representative points P1 to the center lines in the vehicle width direction of the parked vehicles and aligning the center lines in the width direction of the virtual parking frames with respect to the representative points P1 thereby to align the virtual parking frame group with respect to the parked vehicle group (see FIGS. 10A and 10B). Through this operation, the position of the virtual parking frame group of the right-angle parking scheme or the angle parking scheme can be set in the right-left direction (direction in which the virtual parking frames are arranged).

In addition or alternatively, in the determination of the parking frame group of the right-angle parking scheme or the angle parking scheme, when the offset amounts Os' between the positions of the representative points P1 and the positions of the center lines in the width direction of the parking frames closest to those positions are not less than a predetermined value after the parking frame group is determined, the parked vehicle group is further grouped into a plurality of parked vehicle groups (see FIG. 12). This allows the parking frame group to be appropriately determined even when the parking frame group is divided into the right and left groups due to the presence of an obstacle such as a column as the boundary.

In the parking assist method and parking assist device 100 according to one or more embodiments of the present invention, the process of setting the virtual parking frame group of the parallel parking scheme includes calculating the distance D between representative points which is a distance between the representative points P1 adjacent to each other, calculating the length of the parking frames on the basis of the distance D between representative points, and employing the calculated length of the parking frames as the length of the virtual parking frames. Through this operation, even when the length of parking frames in each parking lot is not known, the virtual parking frame group of the parallel parking scheme can be set, and the parking frame group of the parallel parking scheme can be determined.

In addition or alternatively, the process of setting the virtual parking frame group of the parallel parking scheme includes setting the representative points P1 to the center lines in the longitudinal direction of the parked vehicles and aligning the center lines in the longitudinal direction of the virtual parking frames with respect to the representative points P1 thereby to align the virtual parking frame group with respect to the parked vehicle group. Through this operation, the position of the virtual parking frame group of the parallel parking scheme can be set in the front-rear direction (direction in which the virtual parking frames are arranged).

In addition or alternatively, in the determination of the parking frame group of the parallel parking scheme, when the offset amounts Os' between the positions of the representative points P1 and the positions of the center lines in the longitudinal direction of the parking frames closest to those positions are not less than a predetermined value after the parking frame group is determined, the parked vehicle group is further grouped into a plurality of parked vehicle groups. This allows the parking frame group to be appropriately determined even when the parking frame group is divided into the front and rear groups due to the presence of an obstacle such as a column as the boundary.

In the parking assist method and parking assist device 100 according to one or more embodiments of the present invention, the process includes calculating directions of the parked vehicles from the recognition information which is input from the set of ranging sensors 10 and calculating the inclined angle α of the virtual parking frames with respect to the front line on the basis of the calculated directions of the parked vehicles and the positions of the representative points P1 (see FIG. 6 and FIG. 10B). This allows the angle of the virtual parking frames to be appropriately set in the virtual parking frame group of the angle parking scheme, and the parking frame group of the angle parking scheme can be appropriately set.

In the parking assist method and parking assist device 100 according to one or more embodiments of the present invention, the process includes selecting, from among the plurality of parking frames included in the determined parking frame group, the parking frames in which the recognized parked vehicles do not exist, as the parking frames of selection candidates for a target parking position. Through this operation, even in a case (so-called occlusion) in which the far-side parking spaces are hidden by the near-side parked vehicles so as not to be detected by the set of ranging sensors 10, the parking frames of selection candidates can be selected from among the determined parking frame group.

In many cases, the parked vehicles may be displaced from the centers of the parking frames, and the determination of the parking frame group is performed for the purpose of minimizing the errors of positions of the parked vehicles in the parking frames and determining the true values of the parking frames. However, even when the determination of the parking frame group is properly performed, if vehicles parked to the left exist on the right and left of the parking frame into which the subject vehicle is parked, it may be a natural determination for the driver to park the subject vehicle also to the left. In the parking assist method and parking assist device 100 according to one or more embodiments of the present invention, therefore, the positions of the parking frames of selection candidates are offset on the basis of the positions of the representative points P1 of the parked vehicles existing in the determined parking frame group. This allows the target parking position to be set in accordance with the surrounding situations.

In the parking assist method and parking assist device 100 according to one or more embodiments of the present invention, the process includes extracting spaces in which no objects exist and determining whether or not parking is possible into the parking frames of selection candidates on the basis of whether or not the spaces overlap the parking frames of selection candidates. This makes it possible to exclude the parking frames, in which objects that are not recognized as parked vehicles exist, from the selection candidates and allows for appropriate parking assist.

In the parking assist method and parking assist device 100 according to one or more embodiments of the present invention, the process includes setting one of the parking frames of selection candidates for which a determination is made that parking is possible as a parking target position, calculating a parking route to the parking target position, and controlling the subject vehicle so as to travel along the parking route. This allows the automated parking to be executed without the operation performed by the driver.

In addition or alternatively, the process includes calculating a search route for search travel in a parking lot on the basis of the positions of the representative points P1 and controlling the subject vehicle so as to travel along the above search route when a determination is made that parking is not possible into the parking frames of selection candidates. This enables the automated execution of the travel from the search travel for detecting the available parking space to the target parking position without the operation performed by the driver.

In the above-described embodiments, the "parking assist device 100" corresponds to an example of the "parking assist device" in the present invention and the "parking assist ECU 50" corresponds to an example of the "parking assist controller" in the present invention.

In the above-described embodiments, the "representative point P1" corresponds to an example of the "representative points" in the present invention, the "distance D between representative points" corresponds to an example of the "distance between representative points" in the present invention, and the "front line" corresponds to an example of the "predetermined straight line" in the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the above-described embodiments have been described on the assumption that the ranging sensors are equipped in the subject vehicle, but the present invention is not limited to this, and one or more embodiments of the present invention may be carried out on the assumption that the sensors provided at a parking lot, the sensors provided in other vehicles, and/or the cameras carried by the user are used. In such cases, the information on the parking frame group may be acquired from external to perceive the parking state in the parking frame group.

DESCRIPTION OF REFERENCE NUMERALS

50 Parking assist controller
100 Parking assist device

The invention claimed is:

1. A parking assist method comprising:
   acquiring recognition information about a plurality of parked vehicles;
   setting a virtual parking frame group in which a parking frame group is virtualized, the parking frame group comprising a plurality of parking frames;
   selecting representative points set at same positions of the recognized plurality of parked vehicles;
   aligning virtual parking frames of the virtual parking frame group with respect to the representative points of the parked vehicles so that distances between positions of the representative points and predetermined positions of the parking frames closest to those positions are less than a predetermined value for all the representative points and all the parking frames, thereby to align the virtual parking frame group, the virtual parking frames overlapping the parked vehicles; and
   determining the aligned virtual parking frame group as the parking frame group comprising the plurality of parking frames.

2. The parking assist method according to claim 1, wherein the virtual parking frame group comprises a plurality of virtual parking frames that have a same size and are arranged side by side or parallel along a predetermined straight line.

3. The parking assist method according to claim 2, comprising:
  extracting a side-by-side parked vehicle group from the recognition information, the side-by-side parked vehicle group comprising the parked vehicles that are parked side by side;
  selecting representative points of the parked vehicles included in the side-by-side parked vehicle group;
  calculating a distance between representative points that is a distance between the representative points adjacent to each other; and
  calculating a width of the virtual parking frames arranged side by side on a basis of the distance between representative points.

4. The parking assist method according to claim 3, comprising:
  setting the representative points to centers in a vehicle width direction of the parked vehicles; and
  aligning centers in a width direction of the virtual parking frames with respect to the representative points thereby to align the virtual parking frame group with respect to the side-by-side parked vehicle group.

5. The parking assist method according to claim 2, comprising:
  extracting a parallel-parked vehicle group from the recognition information, the parallel-parked vehicle group comprising the parked vehicles that are parked parallel;
  selecting representative points of the parked vehicles included in the parallel-parked vehicle group;
  calculating a distance between representative points that is a distance between the representative points adjacent to each other; and
  calculating a length of the virtual parking frames arranged parallel on a basis of the distance between representative points.

6. The parking assist method according to claim 5, comprising:
  setting the representative points to centers in a vehicle longitudinal direction of the parked vehicles; and
  aligning centers in a longitudinal direction of the virtual parking frames with respect to the representative points thereby to align the virtual parking frame group with respect to the parallel-parked vehicle group.

7. The parking assist method according to claim 2, comprising:
  calculating directions of the parked vehicles from the recognition information; and
  calculating an angle of the virtual parking frames with respect to the predetermined straight line on a basis of the calculated directions of the parked vehicles and positions of representative points.

8. The parking assist method according to claim 1, comprising:
  selecting, from among the plurality of parking frames included in the determined parking frame group, the parking frames in which the recognized parked vehicles do not exist as selection candidates of the parking frames.

9. The parking assist method according to claim 8, comprising
  offsetting positions of the selection candidates of the parking frames on a basis of positions of the representative points of the parked vehicles existing in the determined parking frame group.

10. The parking assist method according to claim 9, comprising
  extracting spaces in which no objects exist; and
  determining that parking is possible into the selection candidates of the parking frames overlapping the spaces.

11. The parking assist method according to claim 10, comprising
  setting one of the selection candidates of the parking frames for which a determination is made that parking is possible as a parking target position;
  calculating a parking route to the parking target position; and
  controlling a subject vehicle so as to travel along the parking route.

12. The parking assist method according to claim 10, comprising
  calculating a search route for search travel in a parking lot on a basis of positions of the representative points; and
  controlling a subject vehicle so as to travel along the search route when parking is not possible into the selection candidates of the parking frames.

13. A parking assist method comprising:
  acquiring recognition information about a plurality of parked vehicles;
  setting a virtual parking frame group in which a parking frame group is virtualized, the parking frame group comprising a plurality of parking frames;
  selecting representative points set at same positions of the recognized plurality of parked vehicles;
  aligning virtual parking frames of the virtual parking frame group with respect to the representative points of the parked vehicles thereby to align the virtual parking frame group, the virtual parking frames overlapping the parked vehicles;
  determining the aligned virtual parking frame group as the parking frame group comprising the plurality of parking frames, the virtual parking frame group comprising the virtual parking frames that have a same size and are arranged side by side along a predetermined straight line;
  extracting a side-by-side parked vehicle group from the recognition information, the side-by-side parked vehicle group comprising the parked vehicles that are parked side by side;
  selecting the representative points of the parked vehicles included in the side-by-side parked vehicle group;
  calculating a distance between representative points that is a distance between the representative points adjacent to each other;
  calculating a width of the virtual parking frames arranged side by side on a basis of the distance between representative points,
  setting the representative points to centers in a vehicle width direction of the parked vehicles; and
  aligning centers in a width direction of the virtual parking frames with respect to the representative points thereby to align the virtual parking frame group with respect to the side-by-side parked vehicle group,
  wherein when distances between positions of the representative points and positions of centers in the width direction of the parking frames closest to those positions are not less than a predetermined value after the parking frame group is determined, the side-by-side parked vehicle group is further grouped into a plurality of side-by-side parked vehicle groups, and the parking frame group is determined again for each of the grouped side-by-side parked vehicle groups.

14. The parking assist method according to claim 13, comprising:

calculating directions of the parked vehicles from the recognition information; and calculating an angle of the virtual parking frames with respect to the predetermined straight line on a basis of the calculated directions of the parked vehicles and positions of representative points.

15. The parking assist method according to claim 13, comprising:

selecting, from among the plurality of parking frames included in the determined parking frame group, the parking frames in which the recognized parked vehicles do not exist as selection candidates of the parking frames.

16. A parking assist method comprising:

acquiring recognition information about a plurality of parked vehicles;

setting a virtual parking frame group in which a parking frame group is virtualized, the parking frame group comprising a plurality of parking frames;

selecting representative points set at same positions of the recognized plurality of parked vehicles;

aligning virtual parking frames of the virtual parking frame group with respect to the representative points of the parked vehicles thereby to align the virtual parking frame group, the virtual parking frames overlapping the parked vehicles;

determining the aligned virtual parking frame group as the parking frame group comprising the plurality of parking frames, the virtual parking frame group comprising the virtual parking frames that have a same size and are arranged parallel along a predetermined straight line;

extracting a parallel-parked vehicle group from the recognition information, the parallel-parked vehicle group comprising the parked vehicles that are parked parallel;

selecting the representative points of the parked vehicles included in the parallel-parked vehicle group;

calculating a distance between representative points that is a distance between the representative points adjacent to each other;

calculating a length of the virtual parking frames arranged parallel on a basis of the distance between representative points, setting the representative points to centers in a vehicle longitudinal direction of the parked vehicles; and aligning centers in a longitudinal direction of the virtual parking frames with respect to the representative points thereby to align the virtual parking frame group with respect to the parallel-parked vehicle group, wherein when distances between positions of the representative points and determined positions of center lines in the longitudinal direction of the parking frames closest to those positions are not less than a predetermined value after the parking frame group is determined, the parallel-parked vehicle group is further grouped into a plurality of parallel-parked vehicle groups, and the parking frame group is determined again for each of the grouped parallel-parked vehicle groups.

17. The parking assist method according to claim 16, comprising:

calculating directions of the parked vehicles from the recognition information; and calculating an angle of the virtual parking frames with respect to the predetermined straight line on a basis of the calculated directions of the parked vehicles and positions of representative points.

18. The parking assist method according to claim 16, comprising:

selecting, from among the plurality of parking frames included in the determined parking frame group, the parking frames in which the recognized parked vehicles do not exist as selection candidates of the parking frames.

19. A parking assist device comprising a parking assist controller having a parking assist function, the parking assist controller being configured to:

acquire recognition information about a plurality of parked vehicles;

set a virtual parking frame group in which a parking frame group is virtualized, the parking frame group comprising a plurality of parking frames;

select representative points set at same positions of the recognized plurality of parked vehicles;

align virtual parking frames of the virtual parking frame group with respect to the representative points of the parked vehicles so that distances between positions of the representative points and predetermined positions of the parking frames closest to those positions are less than a predetermined value for all the representative points and all the parking frames, thereby to align the virtual parking frame group, the virtual parking frames overlapping the parked vehicles; and determine the aligned virtual parking frame group as the parking frame group comprising the plurality of parking frames.

* * * * *